(12) United States Patent
Hortig et al.

(10) Patent No.: US 9,325,567 B2
(45) Date of Patent: Apr. 26, 2016

(54) COMMUNICATION SYSTEM, METHOD FOR OPERATING SUCH A COMMUNICATION SYSTEM, AND COMMUNICATION MODULE

(75) Inventors: Michael Hortig, Neu-Isenburg (DE); Ulrich Kaemmerer, Neu-Isenburg (DE)

(73) Assignee: SCHNEIDER ELECTRIC AUTOMATION GMBH, Seligenstadt (DE)

( * ) Notice: Subject to any disclaimer, the term of this patent is extended or adjusted under 35 U.S.C. 154(b) by 330 days.

(21) Appl. No.: 13/996,127

(22) PCT Filed: Dec. 19, 2011

(86) PCT No.: PCT/EP2011/073302
§ 371 (c)(1),
(2), (4) Date: Sep. 16, 2013

(87) PCT Pub. No.: WO2012/084872
PCT Pub. Date: Jun. 28, 2012

(65) Prior Publication Data
US 2013/0346530 A1    Dec. 26, 2013

(30) Foreign Application Priority Data
Dec. 20, 2010  (DE) .......................... 10 2010 061 352

(51) Int. Cl.
| | | |
|---|---|---|
| G06F 15/16 | (2006.01) | |
| H04L 12/24 | (2006.01) | |
| H04L 12/40 | (2006.01) | |
| H04L 12/403 | (2006.01) | |
| G06N 5/02 | (2006.01) | |

(52) U.S. Cl.
CPC .............. *H04L 41/04* (2013.01); *H04L 12/403* (2013.01); *H04L 12/40032* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,392,285 A | 2/1995 | Kurts | |
| 6,115,713 A * | 9/2000 | Pascucci | ................. G06F 9/465 |
| 2005/0013310 A1* | 1/2005 | Banker | ............... H04L 25/4908 370/401 |
| 2005/0147082 A1 | 7/2005 | Keddy et al. | |
| 2010/0287131 A1* | 11/2010 | Church | .............. G06Q 10/0637 706/47 |

FOREIGN PATENT DOCUMENTS

DE    19710137 A1    10/1997

OTHER PUBLICATIONS

International Search Report dated Mar. 15, 2012, corresponding to International Application No. PCT/EP2011/073302.
Written Opinion corresponding to International Application No. PCT/EP2011/073302.

* cited by examiner

*Primary Examiner* — Viet Vu
*Assistant Examiner* — James Edwards
(74) *Attorney, Agent, or Firm* — Ladas & Parry LLP

(57) ABSTRACT

The invention relates to a communication system having a communication bus, a master device, which is connected to the communication bus and which communicates with the communication bus in a master mode, and several slave devices which can be connected to the communication bus and which communicate with the communication bus in a slave mode. To improve the performance capability of the communication system, the slave devices can be connected to the communication bus using a communication module designed as a proxy, wherein the communication module is connected to the communication bus using an input port and output ports for connecting the slave devices using a point-to-point connection, the communication module has a communication processor connected on the input side to the communication bus and on the output side to a first internal bus by means of a first serial interface.

16 Claims, 5 Drawing Sheets

| Address of the frame received by the master | Destination port | Health flag | Address of the connected slave device | Communication settings for use in slave communication | Optimized timeout value |
|---|---|---|---|---|---|
| 22 | 1 | 1 | 248 | 258 kbit/s / even / 1 stop | 120 ms |
| 73 | 2 | 1 | 1 | 19.2 kbit/s / even / 1 stop | 80 ms |
| 1 | 3 | 0 | 1 | 19.2 kbit/s / odd / 1 stop | 320 ms |
| ... | | | | | |
| ... | | | | | |

Destination association table ZZT

Fig. 3

COMMUNICATION SYSTEM, METHOD FOR OPERATING SUCH A COMMUNICATION SYSTEM, AND COMMUNICATION MODULE

This application is a 371 of PCT/EP2011/073302, filed on Dec. 19, 2011, which claims priority to German Patent Application No. 10 2010 061 352.5, filed on Dec. 20, 2010.

BACKGROUND OF THE INVENTION

The invention relates to a communication system comprising a communication bus, a master device, which is connected to the communication bus and which communicates with the communication bus in a master mode, and several slave devices, which can be connected to the communication bus and which communicate with the communication bus in a slave mode, to a method for controlling and monitoring a communication between a master device and slave devices by means of a communication bus, wherein message frames are sent by the master device by means of the communication bus to the slave devices, and if applicable responses of the slave devices are sent back to the master device by means of the communication bus, as well as to a communication module comprising at least one input port for connecting the communication module to a master device by means of a communication bus as well as a plurality of output ports to which the slave devices can be connected.

A communication system of the type mentioned at the start is known from DE-A-10 2009 049 378. This document relates to a bus-capable connection unit for the connection and for the control of at least one operating device in a bus-oriented programmable electrical installation with a control unit, with at least one controlling unit for the control of the at least one operating device connected to the connection unit, with a control bus for the connection of the at least one control unit to the controlling unit, wherein the control unit comprises a bus connection device for the connection of the connection unit to a bus line of the electrical installation. In this system, the control bus is designed for the transmission of energy and data between the control unit and the at least one controlling unit, wherein the control unit comprises an energy supply unit for the energy supply of the control unit and of the at least one controlling unit, and the control bus is designed for the parallel connection of several controlling units.

A further communication system as well as an additional method for operating such a system is known from DE-B-198 08 230. The communication system comprises a communication bus, several electrical devices connected to the bus, which communicate with the bus in a slave mode, as well as a PC as main or master processor, which is connected to the bus and which works in a master mode. Furthermore, the system comprises a first monitor processor, which is connected to the bus, and communicates with the bus in a slave mode, when the master processor is in operation, wherein the first monitor processor communicates with the bus in a master mode, when the master processor is not in operation.

The communication system also has to communicate with electrical elements or slaves, which are connected to the communication bus, when the PC or master is not capable of transmission.

In the known communication system, the master device and the slave devices are connected directly by means of an RS-485 port to the serial communication bus.

A serial communication bus is used in the system in order to exchange data between the automation devices. Here, a plurality of protocols can be used, wherein mostly the master-slave principle in the half-duplex mode is used.

Before such a network is ready for operation, communication settings have to be set, such as the speed, parity bits, number of stop bits, for example, for each device depending on the values defined for the system. Furthermore, a unique address must be associated with each device before said device can be operated in the network. It is only then that a further configuration via the network is possible.

To implement the configuration, most devices require a corresponding PC application. Since the devices are not ready to be operated in the network prior to the implementation of a suitable communication configuration, they have to be connected once in a point-to-point connection directly to the PC.

When selecting the communication settings to be used in the communication system the communication properties of all the devices that are possibly connected to the network have to be taken into consideration. The maximum possible speed within the network results from the smallest common denominator and it is thus predetermined by the "weakest" device.

Other communication settings, such as parity bits or number of stop bits, for example, also have to be the same for each device. Without establishing a common base with regard to the speed and to the other communication parameters, the devices are not compatible and thus they cannot be operated in the same network.

In the operation of the communication system, the master device sends queries (requests) in the form of message frames to the slave devices and it receives answers (responses) which are sent back by the slave devices. Each message frame received by a slave device has to be evaluated in the respective slave device with regard to its address and checksum (CRC, Cyclic Redundancy Check), in order to detect whether the message frame is intended for the respective slave device or not. In order to process each received message frame, the slave device must perform corresponding calculations. During this time period, other system tasks have to be interrupted.

When the master device sends a request, the latter device waits for a predetermined time span (timeout), in which an answer (response) is expected to be sent back by the slave device. This time span (timeout) can be configured in the master device. The timeout value must be set depending on the slave device which takes the most time to respond. This is typically a multiple of the time required for a regular transaction, wherein, for example, in the case of a regular transaction of approximately 50 ms, a timeout value of 1000 ms is usually set.

Consequently, the absence of a slave device, for example, by disconnecting the slave device or by means of an interrupted line, has massive consequences on the entire network time behavior. This can also have a negative influence on intact slave devices, which expect a recurring request, in that, if the repeating query does not take place due to the waiting of the disturbed participant, they fall into a safe state of their main function, and thus no longer fulfill their function properly.

It results from the above that the slave devices first have to be configured in a point-to-point mode with a PC, before they can be integrated in a network and addressed via said network.

In large distributed systems, it is very time consuming to visit the slave devices in order to configure them. This is inefficient both in the setting up of the communication system and also in the replacement of a defective device.

A further disadvantage is that a common communication base must be supported by all the devices that are possibly connected to the communication. If no such a common denominator exists with regard to speed, parity bits, number of stop bits, etc., the devices cannot be operated in the same network. In addition, the network performance is limited by the "weakest" device.

Independently thereof, absent or defective devices have a massive effect on the network timing. Intact devices can also be influenced negatively.

SUMMARY OF THE INVENTION

Accordingly, the present invention is based on the problem of further developing a communication system as well as a method for operating such a communication system according to the type described at the start, in such a manner that the performance capability of the communication system is improved. Furthermore, a communication module is proposed for carrying out the method.

The problem is solved according to the invention in that the slave devices can be connected by means of a communication module designed as a proxy to the communication bus, wherein the communication module is connected by means of an input port to the communication module, and it has output ports for the connection of the slave devices by point-to-point connection, in that the communication module has a communication processor, which is connected on the input side to the communication bus and on the output side to a first internal bus by means of a first serial interface, wherein each of the output ports is connected to the first internal bus in each case by means of a first switchable transceiver, and in that the communication processor has an association table with data pertaining to the association of destination addresses with output ports, communication parameters and/or slave device addresses, so that incoming message frames can be analyzed with regard to their destination address and forwarded, taking into consideration the data of the association table, to one of the output ports using the associated communication parameters for the slave device connected to this output port.

In order to be able to carry out, in parallel to the regular communication, a verification of disturbed output ports or slave devices, it is provided that the communication processor is connected by means of a second serial interface to a second internal bus, wherein the output ports in each case are connected by means of a second switchable transceiver to the second internal bus, wherein slave devices or output ports that do not send back a reply to a query of the communication processor by means of the first bus can be queried cyclically by means of the communication processor by means of the second bus in parallel to the regular communication by means of the first internal bus.

The communication processor is connected by means of a third serial interface and by means of a third transceiver to the communication bus, wherein the communication bus preferably has an RS-485 format.

In a preferred embodiment, the point-to-point connection between slave device and output device of the communication module is also designed in an RS-485 format.

For the control of the communication by means of the internal buses to the individual output ports, the first and second transceivers are designed so that they are controllable. Preferably, the first and second transceivers are connected each by a line to an output of the communication processor.

The problem is solved according to the invention by a method wherein the slave devices are connected by means of first switchable transceivers and a first internal bus to a communication processor, which is connected on the input side to the communication bus, wherein the communication processor carries out the following process steps:

reading a destination address from a received message frame, fetching the destination configuration associated with the destination address from an association table, wherein the destination configuration comprises a destination output port, an address of the destination slave device and/or communication parameters of the destination slave device, activating the destination output port by switching the first transceiver associated with the destination output port, transmitting the message frame to the destination output port, and transmitting a response of the slave device to the master device in the case of an undisturbed communication.

In order to calculate an optimal timeout value, it is preferable to provide that the communication processor monitors the ongoing communication for each output port by detecting a typical reaction time of the slave device.

In parallel to the regular communication, according to a preferred process step, it is provided that the slave devices connected to the communication processor are cyclically queried regarding function, wherein then, if a reply has not been received within a predetermined reaction time ("timeout"), an internal "health flag" for the corresponding output port is reset in the association table, and wherein the communication processor itself provides a reply to each query, which was made to the disturbed slave device, to the master device, and in that the communication processor at the same time continuously attempts, by means of a second internal bus, to obtain a reply from the disturbed slave device, in that the communication processor itself sends messages to the slave device.

According to an additional preferred procedure, it is provided that, during the implementation of the regular communication by means of the first internal bus, a verification of the "health flag" occurs, wherein then, if the "health flag" has the logic state "0," the communication processor sends an "exception message" as reply to the master device, and then, if the "health flag" has the logic state "1," it enables the transceiver for the undisturbed communication of the destination output port.

Moreover, the problem is solved by a communication module, in that the communication module is designed as a proxy, comprising a communication processor, which is connected on the input side to the communication bus and on the output side to a first internal bus by means of a first serial interface, wherein each of the output ports is connected in each case by means of a first switchable transceiver to the first internal bus, in that the communication processor is connected to a second internal bus by means of a second serial interface, wherein each of the output ports is connected to the second internal bus in each case by means of a second switchable transceiver.

Additional details, advantages and characteristics of the invention result not only from the claims, the characteristics that can be obtained from them—separately and/or in combination—, but also from the following description of preferred embodiment examples that can be taken from the drawing.

BRIEF DESCRIPTION OF THE DRAWINGS

FIG. 3 shows a destination association table.

DESCRIPTION OF THE PREFERRED EMBODIMENTS

Figure 1:
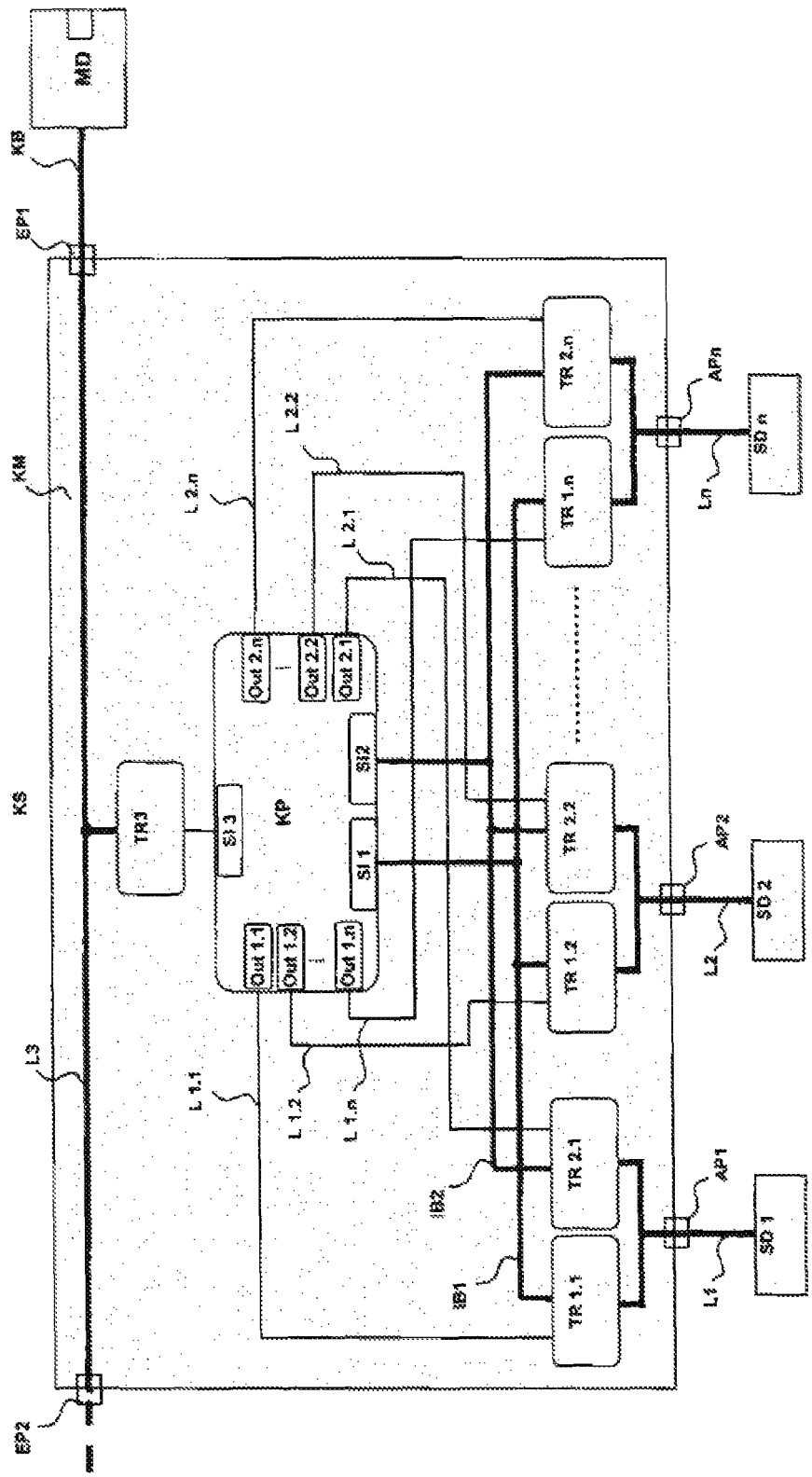
FIG. 1 shows a diagrammatic representation of the communication system with master device, communication bus, communication module and with slave devices connected to said communication module.

FIG. 1 shows a diagrammatic representation of a communication system KS, comprising a plurality of slave devices SD1, SD2 . . . SDn, such as sensors, motor control systems, measuring devices, which are connected by means of a communication module KM and a communication bus KB, such as a serial bus in RS-485 format, to a master device MD, such as an automation device.

The slave devices SD1, SD2 . . . SDn are each connected by means of a line L1, L2 . . . Ln in the form of an RS-485 point-to-point connection in each case to an output port AP1, AP2 . . . APn of the communication module KM. The output ports AP1, AP2 . . . APn are connected in each case by means of a first transceiver TR1.1, TR1.2 . . . TR1.n to a first internal bus IB1, which is connected to a first serial interface SI1 of a communication processor KP. Furthermore, each of the output ports AP1, AP2 . . . APn is connected by means of a second transceiver TR2.1, TR2.2 . . . TR2.n to a second internal bus IB2, which is connected at a second serial interface SI2 of the communication processor KP.

The first transceivers TR1.1, TR1.2 . . . TR1.n are in each case connected by means of a line L1.1, L1.2 . . . L1.n to outputs Out1.1, Out1.2 . . . Out1.n of the communication processor, so that the transceivers can be switched between a conductive (active) and a nonconductive (inactive) state. Furthermore, the second transceivers TR2.1, TR2.2 . . . TR2.n are connected by means of lines L2.1, L2.2 . . . L2.n to outputs Out2.1, Out2.2 . . . Out2.n, in order to switch the transceivers between a conductive and a nonconductive state.

The communication processor KP is connected by means of a serial interface SI3, a transceiver TR3 and a line L3 to input ports EP1, EP2, wherein the input port EP1 is connected by means of the communication bus KB to the master device MD.

The communication module KM is designed as an intelligent infrastructure element with proxy functionality, and it is used as connection between the communication bus KB and the slave devices SD1, SD2 . . . SDn connected to the output ports AP1, AP2 . . . APn.

For configuration purposes, the communication module KM can be accessed by means of the communication bus KB, wherein the address of the communication module KM and the communication settings used in the communication bus KB have to be configured. This can be implemented either by means of mechanical switches or by storage access, for example, using card readers or a USB interface. A complete configuration management by the mentioned storage media is also conceivable.

By means of the communication processor KP, the transceivers TR1.1, TR1.2 . . . TR1.n and TR2.1, TR2.2 . . . TR2.n as well as an RS485 to RS485 gateway (proxy) structure for each of the output ports AP1, AP2 . . . APn, a complete physical separation of the communication bus KB from the output ports AP1, AP2 . . . APn occurs.

The communication processor KP controls and monitors the communication flow to the output ports AP1, AP2 . . . APn.

Each message frame received from the communication processor KP by means of the communication bus KB is analyzed by the communication processor KP with regard to its destination address, and it is forwarded to one of the output ports AP1, AP2 . . . APn to which this address is assigned. The address assignment to each of the output ports AP1, AP2 . . . APn is part of the configuration of the communication module. Thus, the requirement for a uniform addressing of the slave devices is shifted to the communication module KM designed as a proxy. Consequently, any address can be associated with each slave device connected to an output port AP1, AP2 . . . APn, for example, a standard (default) or a predefined address. Furthermore, the multiple use of the same address for more than one device is possible.

Besides the routing functionality of the communication processor KP, the latter also adapts the communication parameters used by the slave devices, which are connected to the output ports AP1, AP2 . . . APn. Due to this capability, it is possible to operate each slave device SD1, SD2 . . . SDn with different communication settings. Thus, a "common denominator" is no longer necessary in the case of communication settings in regard to the speed, parity bits and number of the stop bits. The respective most advantageous communication settings for each output port AP1, AP2 . . . APn are part of the configuration of the communication module, or they can be detected by automatic adaption of the communication module to the slave devices, to the extent that they are connected to the respective output port.

Figure 2:
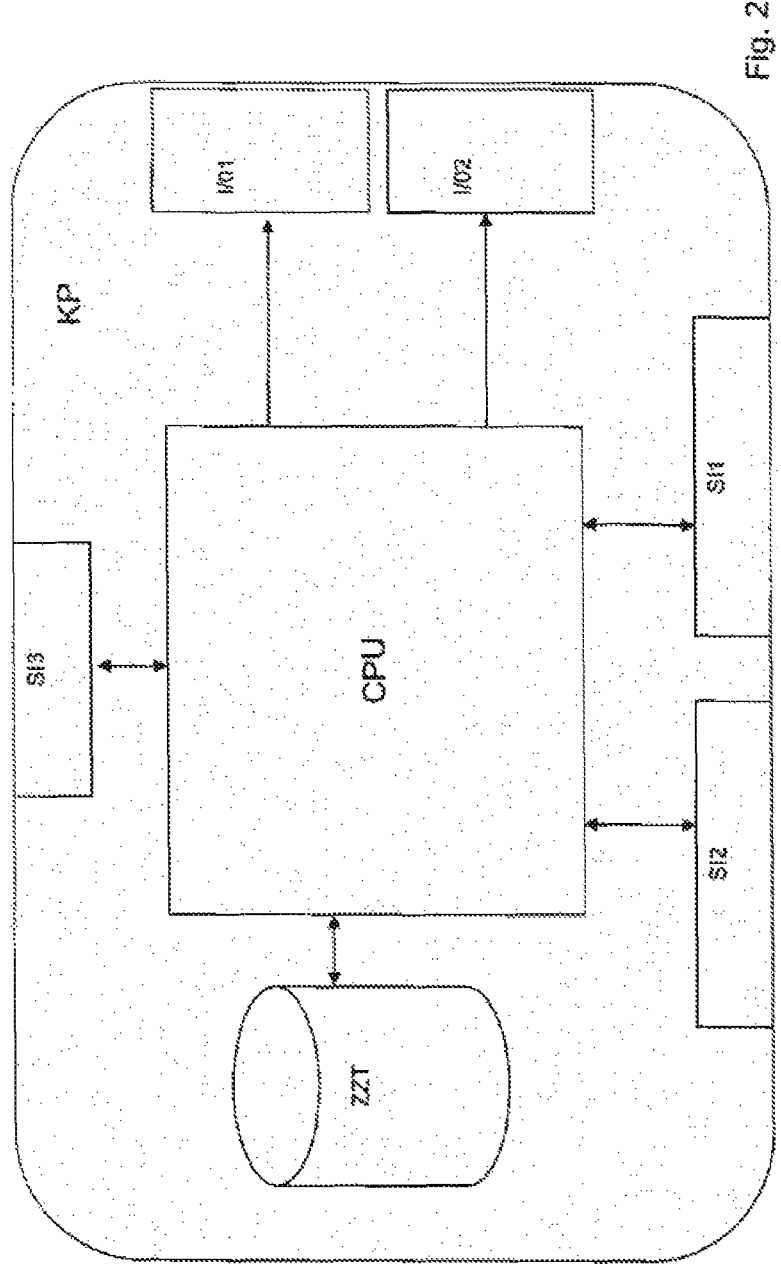
FIG. 2 shows an internal logic architecture of a communication processor contained in the communication module.

In a destination association table ZZT, data concerning the association of destination addresses with destination output ports AP1, AP2 . . . APn, communication settings for each slave communication as well as the address of the connected slave device are stored. The destination association table ZZT is stored in an internal or external memory of the communication processor KP. An internal logic structure of the communication processor KP is represented diagrammatically in FIG. 2. The contents of the destination association table ZZT are represented as an example in FIG. 3.

Figure 4:
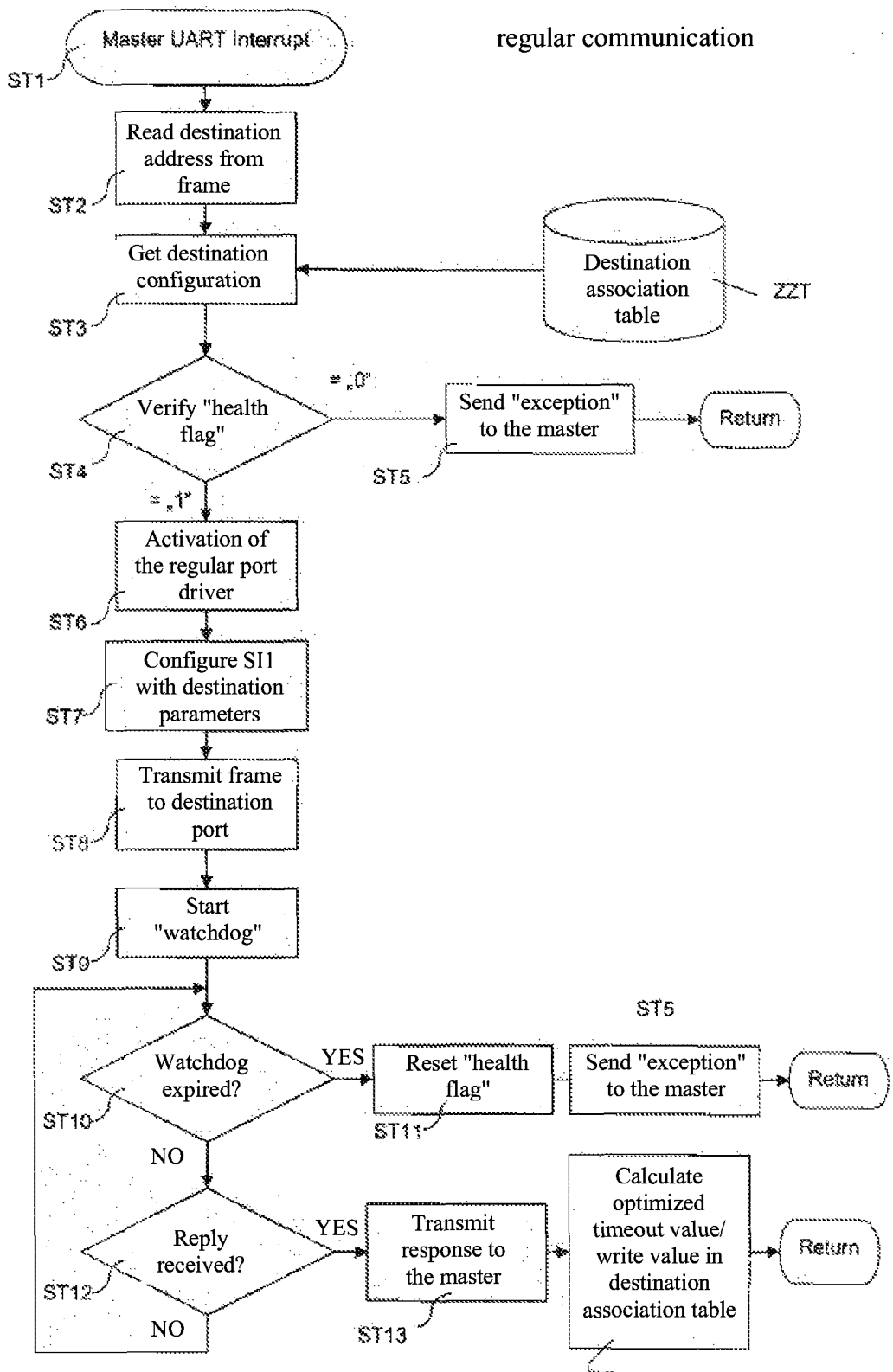
FIG. 4 shows a diagrammatic flow diagram in the case of an undisturbed communication.

A course of an undisturbed communication flow will be explained in reference to the flow diagram represented in FIG. 4.

After a "master UART interrupt" in step ST1, the communication processor KP in step ST2 reads a destination address, "22," for example, from a received message frame and, in a following step ST3, it fetches a destination configuration associated with the destination address ZZ: destination output port=AP1; health flag; address of the connected slave device=248; communication settings=258 kbit/s; even; 1 stop" from the destination association table ZZT.

Subsequently, in step ST4, a verification is carried out to determine whether the destination port associated with the received destination address is in a disturbed or undisturbed state. For this purpose, in the destination association table ZZT, a so-called "health flag" is defined, which has the logic state "0" or "1." If the "health flag" has the logic state "0," then the communication processor KP sends an "exception message" to the master device, in a step ST5.

If the "health flag" is on logic "1," then in step ST6 an enabling of a first port driver TR1.1, TR1.2 . . . TR1.n for regular communication occurs in accordance with the destination association, and, in step ST7, the configuration of the first serial interface ST1 with the destination parameters and the message frame is transmitted in step ST8 to the destination output port AP1, for example. Next, in step ST9, a "watchdog" is started, which is monitored in step ST10. If the "watchdog" has expired, the "health flag" is reset in step ST11, because the destination output port AP1 may be disturbed, then, in step ST5, an "exception message" is sent to the master device.

If the "watchdog" is not exceeded, a verification is carried out in step ST12 to determine whether a response has been received from the slave device SD1. In the affirmative case, in step ST13, the received response is sent as a message to the master device MD. If no response was received, the "watchdog" continues to be monitored in step ST10.

In order to prevent multi-master timeout events, which are caused by the same problem, a disturbed slave device, for example, and in order to optimize the effective timeout duration, the communication processor KP monitors the ongoing communication for each output port AP1, AP2 . . . APn. During the regular communication described in reference to FIG. 4, the typical response time of the connected slave device is detected and used in order to calculate an optimized timeout value, for example, twice the value of the usual response time, in the communication processor for each output port (step ST14). Said value is also stored in the destination association table ZZT.

In the case of a slave device (SD1, SD2 . . . SDn) that does not respond, the communication processor KP waits only for the optimized timeout duration, and, after the expiration of the timeout, it sends an "exception" message to the master and sets the internal "health flag" for the affected output port to error or to logic value "0."

From this time on, the communication processor responds to each query, which is intended to be forwarded to the slave device that is connected to the disturbed output port, autonomously with an "exception" response to the master device (step ST5).

At the same time, a continuous attempt is made to obtain a response, by the autonomous sending of messages to the disturbed slave device. Due to the structure of the communication processor, in particular due to the two internal buses IB1, IB2, which are each connected to a serial interface SI1 or SI2, the above communication occurs for the cyclic verification of disturbed slave devices in parallel to the regular communication with the undisturbed slave devices, without any resulting loss of time. As soon as the "disturbed" slave device can be reached again, for example, by a response to a query of the communication processor KP, the "health flag" is set again in the destination association table ZZT, and all the messages, which are received by means of the communication bus KB by the communication processor KP for this output port, are forwarded to the slave device.

Figure 5:
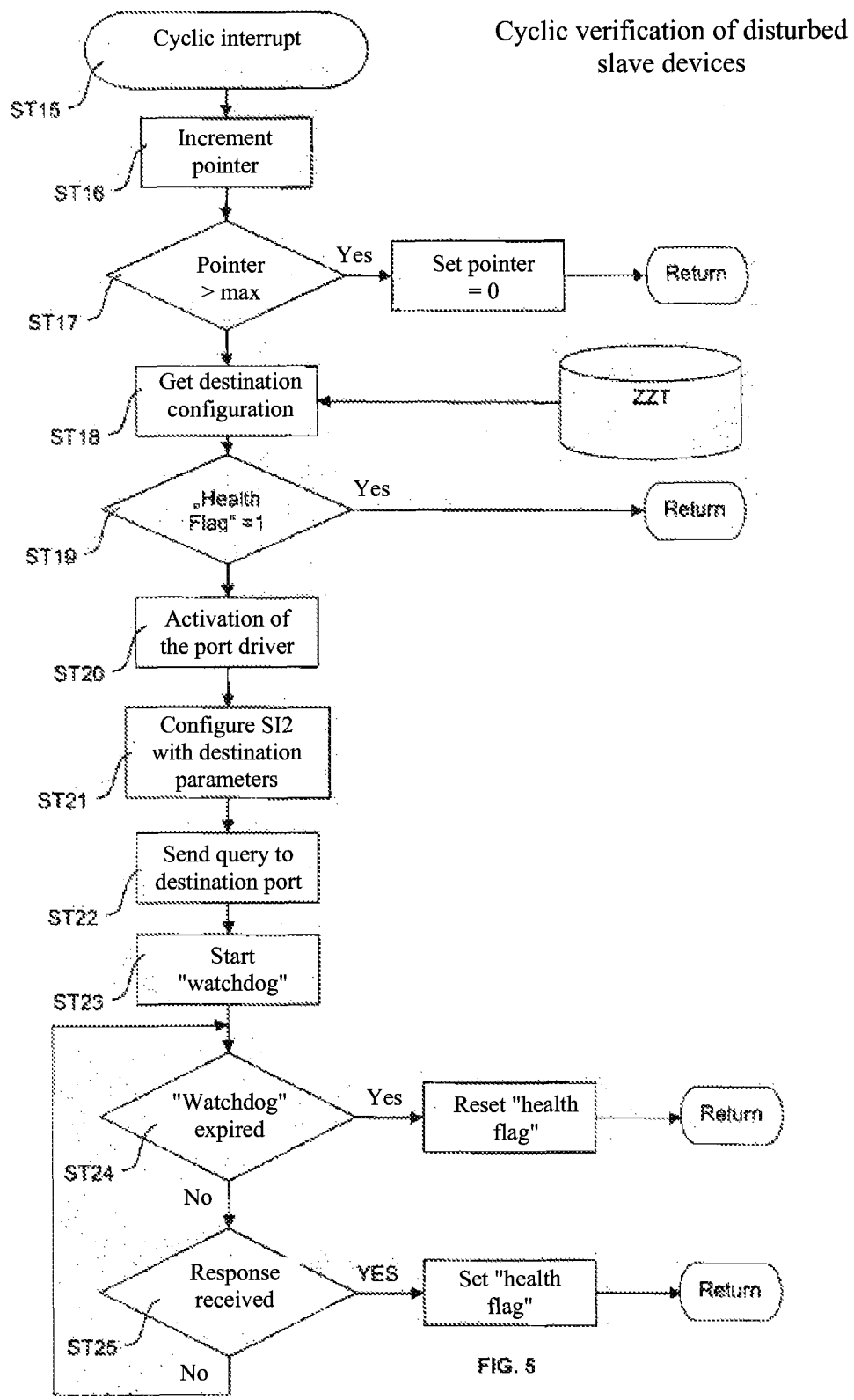
FIG. 5 shows a diagrammatic flow diagram in the case of a disturbed communication as a result of a defective slave device.

A diagrammatic procedure during the cyclic verification of disturbed slave devices is represented in FIG. 5 as a flow diagram. After a cyclic interrupt in step ST15, the pointer is incremented in the destination association table ZZT in step ST16.

If the pointer is greater than the maximum number of entries in the ZZT, it is set to zero in step ST17, and the interrupt routine is exited. In step ST18, the destination configuration is fetched from the destination association table ZZT to which the pointer points. In step ST19, the status of the "health flag" entry is verified, and if the flag is set, the interrupt routine is exited. If the flag is zero, then, in step ST20, the enabling of the second transceiver of the defective output port occurs, and, in step ST21, the configuration of the second serial interface SI2 with the destination parameters occurs.

Subsequently, in step ST22, a query is sent to the destination port, and in step ST23, the "watchdog" is started. In step ST24, the course of the "watchdog" is monitored, and then, when the "watchdog" is expired, the "health flag" is reset, and the interrupt routine is exited.

If the "watchdog" in step ST24 has not expired, then a verification is carried out in step ST25 to determine whether a response from the slave device has been received. In the affirmative case, the "health flag" is set, and the interrupt routine is exited. Otherwise, there is a return to step ST24, that is, to the verification of the "watchdog."

The invention claimed is:

1. A communication system (KS) comprising a communication bus (KB), a master device (MD) which is connected to the communication bus and which communicates with the communication bus (KB) in a master mode, and several slave devices (SD1, SD2 . . . SDn) which can be connected to the communication bus (KB) and which communicate with the communication bus (KB) in a slave mode,
   wherein the slave devices (SD1, SD2 . . . SDn) can be connected by means of a communication module (KM) designed as a proxy to the communication bus (KB), wherein the communication module (KM) is connected by means of an input port (EP1) to the communication bus (KB), and has output ports (AP1, AP2 . . . APn) for the connection of the slave devices (SD1, SD2 . . . SDn) by a point-to-point connection,
   in that the communication module (KM) has a communication processor (KP), which is connected on the input side to the communication bus (KB) and on the output side to a first internal bus (IB1) by means of a first serial interface (SI1), wherein each of the output ports (AP1, AP2 . . . APn) is connected to the first internal bus (IB1) in each case by means of a first switchable transceiver (TR1.1, TR1.2 . . . TR1.n),
   wherein the communication processor (KP) has an association table (ZZT) with data pertaining to the association of destination addresses with output ports (AP1, AP2 . . . APn), communication parameters and/or slave device addresses, wherein incoming message frames can be analyzed with regard to their destination address and forwarded, taking into consideration the data of the association table (ZZT), to one of the output ports (AP1, AP2 . . . APn) using the associated communication parameters for the slave device (SD1, SD2 . . . SDn) connected to the output port (AP).

2. The communication system according to claim 1, wherein the communication processor (KP) is connected by means of a second serial interface (SI2) to a second internal bus (IB2), wherein the output ports (AP1, AP2 . . . APn) are each connected by means of a second switchable transceiver (TR2.1, TR2.2 . . . TR2.n) to the second internal bus (IB2), wherein slave devices (SD1, SD2 . . . SDn) or output ports (AP1, AP2 . . . APn) which do not send back a reply to a query of the communication processor (KP) by means of the first bus can be cyclically queried by the communication processor (KP) by means of the second bus (IB2) in parallel to the regular communication by means of the first internal bus (IB1).

3. The communication system according to claim 1, wherein the communication processor (KP) is connected by means of a third serial interface (SI3) and by means of a third transceiver (TR3) to the communication bus (KB).

4. The communication system according to claim 1, wherein the communication bus (KB) has an RS-485 format.

5. The communication system according to claim 1,
wherein the point-to-point connection (L1, L2 ... Ln) between slave device (SD1, SD2 ... SDn) and output port (AP1, AP2 ... APn) of the communication module (KM) has an RS-485 format.

6. The communication system according to claim 1,
wherein the first transceivers (TR1.1, TR1.2 ... TR1.$n$) are connected in each case by means of a line (L1.1, L1.2 ... L1.$n$) to an output (Out1.1, Out1.2 ... Out1.$n$) of the communication processor (KP), and wherein the second transceivers (TR2.1, TR2.2 ... TR2.$n$) are connected by means of a line (L2.1, L2.2 ... L2.$n$) to an output (Out2.0, Out2.2 ... Out2.$n$) of the communication processor (KP).

7. The method according to claim 1,
wherein in the case of the performance of the regular communication by means of the first internal bus (IB1), a verification of the "health flag" occurs, wherein, if the "health flag" has the logic state "0," the communication processor (KP) sends an "exception message" to the master device (MD), and then, if the "health flag" has the logic state "1," it enables the transceiver for the undisturbed communication of the destination output port (AP1, AP2 ... APn).

8. The method according to claim 1,
wherein, in the case of a cyclic verification of the slave device, a verification of a "healthy flag" list occurs, wherein, for a flag entry that is first in the list, an associated destination configuration is obtained from the association table (ZZT), wherein an enabling of the transceiver occurs for an undisturbed communication of the output port with defective or disturbed slave device, wherein the message frame is sent to the destination output port, wherein, if a time period is exceeded, the "health flag" is set back, and a "list pointer" of the "healthy flag" list is increased.

9. The method according to claim 1,
wherein, during a course of a "watchdog," a verification is carried out to determine whether a response of the slave device has been received, wherein, in the case of the reception of a response, a "health flag" is set, and wherein, if no response has been received, "watchdog" continues to be verified until the expiration, and wherein, if the "watchdog" duration has been exceeded, the "health flag" is set back.

10. A method for controlling and monitoring a communication between a master device (MD) and slave devices (SD1, SD2 ... SDn) by means of a communication bus (KB), wherein message frames are sent by the master device (MD) by means of the communication bus (KB) to the slave devices (SD1, SD2 ... SDn), and if applicable responses of the slave devices are sent back to the master device (MD) by means of the communication bus (KB),
wherein the slave devices (SD1, SD2 ... SDn) are connected by means of first switchable transceivers (TR1.1, TR1.2 ... TR1.$n$) and by means of a first internal bus (IB1) to a communication processor (KB), which is connected on the input side to the communication bus (KB), wherein the communication processor (KP) performs the following process steps:
reading a destination address from a received message frame,
fetching the destination configuration associated with the destination address from an association table (ZZT), wherein the destination configuration comprises a destination output port (AP1, AP2 ... APn),
an address of the destination slave device and/or communication parameters of the destination slave device,
activating the destination output port (AP1, AP2 ... APn) by switching the first transceiver (TR1.1, TR1.2 ... TR1.$n$) associated with the destination output port,
transmitting the message frame to the destination output port (AP1, AP2 ... APn), and
transmitting a response of the slave device (SD1, SD2 ... SDn) to the master device (MD) in the case of an undisturbed communication.

11. The method according to claim 10,
wherein the communication processor (KP) monitors the ongoing communication for each output port (AP1, AP2 ... APn) by detecting a typical reaction time of the slave device, wherein the reaction time is used for the calculation of an optimal timeout value.

12. The method according to claim 10,
wherein the slave devices (SD1, SD2 ... SDn) connected to the communication processor (KP), in the case of a disturbance, are queried cyclically regarding function, wherein, if a reply has not been received within a predetermined reaction time ("timeout"), an internal "health flag" for the corresponding output port (AP1, AP2 ... APn) is reset in the association table (ZZT), and wherein the communication processor (KP) responds itself to each query, which was made to the undisturbed slave device, to the master device (MG), and wherein the communication processor (KP) at the same time attempts continuously, by means of a second bus (IB2), to obtain a response from the disturbed slave device (SD1, SD2 ... SDn), wherein the communication processor itself sends messages to the slave device (SD1, SD2 ... SDn).

13. A communication module (KM), comprising at least one input port (EP1) for connecting the communication module (KM) by means of a communication bus (KB) to a master device (MD) as well as a plurality of output ports (AP1, AP2 ... APn) to which the slave devices (SD1, SD2 ... SDn) can be connected,
wherein the communication module (KM) is designed as a proxy, comprising a communication processor (KP), which is connected on an input side to the communication bus (KB) and on an output side to a first internal bus (IB1) by means of a first serial interface (SI1), wherein each of the output ports (AP1, AP2 ... APn) is connected in each case to the first internal bus by means of a first switchable transceiver (TR1.1, TR1.2 ... TR1.$n$), wherein the communication processor (KP) is connected to a second internal bus (IB2) by means of a second serial interface (SI2), wherein each of the output ports (AP1, AP2 ... APn) is connected to the second internal bus (IB2) in each case by means of a second switchable transceiver (TR2.1, TR2.2 ... TR2.$n$).

14. The communication module (KM) according to claim 13,
wherein the communication processor (KM) has an association table (ZZT) with data pertaining to the association of destination addresses with the output ports (AP1, AP2 ... APn), communication parameters and/or slave device addresses, wherein incoming message frames can be analyzed with regard to their destination address, and can be forwarded, taking into consideration the data of the association table (ZZT), to an output port (AP1, AP2 ... APn) using the associated communication parameters for the slave device (SD1, SD2 ... SDn) connected to the output port (AP1, AP2 ... APn).

15. The communication module (KM) according to claim 13,
wherein the communication processor (KP) is connected by means of a third serial interface (SI3) and by means of a third transceiver (TR3) to the communication bus.

16. The communication module (KM) according to claim 13,
wherein the first and second transceivers (TR1.1, TR1.2 ... TR1.$n$; TR2.1, TR2.2 ... TR2.$n$) are connected in each case by means of a connection (L1.1, L1.2 ... L1.$n$; L2.1, L2.2 ... L2.$n$) in each case to an output (Out1.1, Out1.2 ... Out1.$n$; Out2.1, Out2.2 ... Out2.$n$) of the communication processor (KP).

* * * * *